United States Patent
Stuart et al.

[11] 3,903,478
[45] Sept. 2, 1975

[54] FLUID DENSITY MEASURING SYSTEM

[75] Inventors: Douglas E. Stuart, Middlebury; Paul G. Weitz, Salisbury Plains; David A. Lamphere, Milton, all of Vt.

[73] Assignee: Simmonds Precision Products, Inc., Tarrytown, N.Y.

[22] Filed: July 30, 1974

[21] Appl. No.: 493,138

[52] U.S. Cl. .............................................. 324/61 R
[51] Int. Cl. ........................................... G01r 27/26
[58] Field of Search .................. 324/61 R; 317/246; 73/32 R

[56] References Cited
UNITED STATES PATENTS

| | | | |
|---|---|---|---|
| 2,800,628 | 7/1957 | Stinson et al. | 324/61 R |
| 2,826,738 | 3/1958 | Lupfer et al. | 324/61 R |
| 3,123,751 | 3/1964 | Balsbaugh | 324/61 R X |
| 3,176,222 | 3/1965 | Atkisson | 324/61 R |
| 3,421,077 | 1/1969 | Liu et al. | 324/61 |

*Primary Examiner*—Stanley T. Krawczewicz
*Attorney, Agent, or Firm*—Edwin E. Greigg

[57] ABSTRACT

This invention relates to a fluid density measuring device comprising spaced capacitor electrodes between which fluid under measurement can flow. The capacitance between the plates is a function of the density of the fluid. An oscillator drives an alternating current between the capacitor electrodes, the magnitude of the current being proportional to the capacitance between the electrodes. A reference current of a magnitude equal to a predetermined value corresponding to an expected minimum fluid density is subtracted from the actual current between the electrodes to produce a signal directly proportional to the variation of fluid density. This signal is then amplified, and thereafter a bias signal accurately representing a minimum fluid density is then added back to the amplified density variation signal to produce an output signal directly proportional to the fluid density. This signal can be fed to any suitable display or control equipment.

8 Claims, 3 Drawing Figures

FLUID DENSITY MEASURING SYSTEM

BACKGROUND OF THE INVENTION

1. Field of the Invention

The invention relates to fluid density measuring devices (fluid densitometers).

2. Description of the Prior Art

There has been previously proposed a fluid densitometer in which a sample of the fluid whose density is to be measured is separated into a container where the density measurement is then made by a suitable method (for example by weighing the filled container whose volume is known). These densitometers are disadvantageous in that they require a static fluid sample in order to make an accurate measurement.

Other previously proposed densitometers while not requiring a separate container for density measurements, are dependent on flow rate and/or pressure remaining constant for best accuracy and are disadvantageous for this reason.

It is an object of the invention to provide an improved fluid densitometer.

It is a further object of the invention to provide a densitometer capable of measuring the density of fluids in a static or dynamic state with an accuracy independent of fluid flow conditions.

SUMMARY OF THE INVENTION

According to the invention there is provided a fluid densitometer comprising two spaced capacitor electrodes, means for passing fluid between the electrodes such that the capacitance between the electrodes is dependent upon the dielectric constant, and therefore the density of the fluid between the electrodes, a reference capacitor, a source of alternating current having first and second outputs, first connecting means connecting the first output across the two said electrodes to drive an alternating current between the electrodes, whose magnitude is dependent upon the capacitance therebetween, second connecting means connecting the second output across the reference capacitor to drive an alternating curremt therethrough whose magnitude is equal to a predetermined low value of the current between the said electrodes, first circuit means connected to the first and second connecting means and arranged to subtract the current through the reference capacitor from the current between the electrodes to derive a current signal directly proportional to the variation of capacitance between the electrodes, means for producing a bias signal proportional to a predetermined low fluid density, and second circuit means connected to the first circuit means and the bias means to combine the said current signal with the bias signal to produce a combined signal directly proportional to the density of the fluid.

According to the invention there is also provided a fluid densitometer comprising two spaced capacitor electrodes, means for passing fluid between the electrodes such that the variation of capacitance between the electrodes is dependent upon the variation of the fluid density, an oscillator connected between the two said electrodes to drive an alternating current between the two said electrodes whose magnitude is dependent upon the variation of the capacitance therebetween above a predetermined minimum capacitance value, first circuit means connected to the oscillator and the two said electrodes, and arranged to derive a first signal therefrom proportional to the part of the said alternating current which is dependent upon the variation of capacitance between the said electrodes, bias means for producing a second signal proportional to a predetermined low fluid density, and second circuit means connected to the first circuit means and the bias means to combine the first signal with the said second signal whereby the combined signal is directly proportional to the density of the fluid.

According to the invention there is further provided a fluid densitometer, comprising two capacitor electrodes, electrical insulating means maintaining a predetermined spacing between the electrodes, means for passing fluid between the electrodes such that the variation of capacitance between the electrodes is dependent on the variation of density of the fluid, a three-terminal alternating current source in which the alternating currents respectively produced between the first and second terminals and between the third and second terminals are 180° out of phase, a reference capacitor having a predetermined capacitance value, first connecting means connecting the two capacitor electrodes in series between the first and second terminals, second connecting means connecting the reference capacitor in series between the third and second terminals and having a common circuit path with the first connecting means, the predetermined capacitance value of the reference capacitor being selected such that the net current in the common circuit path is directly proportional to the variations of capacitance between the two said electrodes and independent of the absolute capacitance therebetween, a current amplifier connected to amplify the current in the said common circuit path between the first and second connecting means to produce a first current signal, signal means for producing a second current signal proportional to a predetermined low fluid density, and an adder circuit connected to receive and add the first and second current signals to produce a combined output signal proportional to the density of the said fluid.

BRIEF DESCRIPTION OF THE DRAWINGS

A fluid densitometer embodying the invention will now be described, by way of example, with reference to the accompanying diagrammatic drawings in which.

DESCRIPTION OF THE PREFERRED EMBODIMENT

The fluid densitometer to be described is suitable for measuring the density of liquids and comprises a capacitance transducer connected to signal conditioning circuitry.

Figure 1:
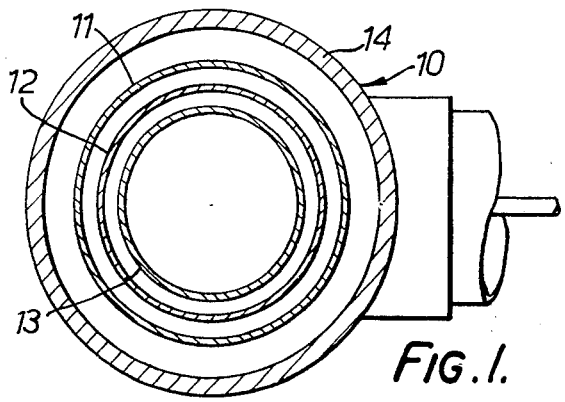
FIG. 1 is a cross-section of a transducer of the densitometer.
Figure 2:
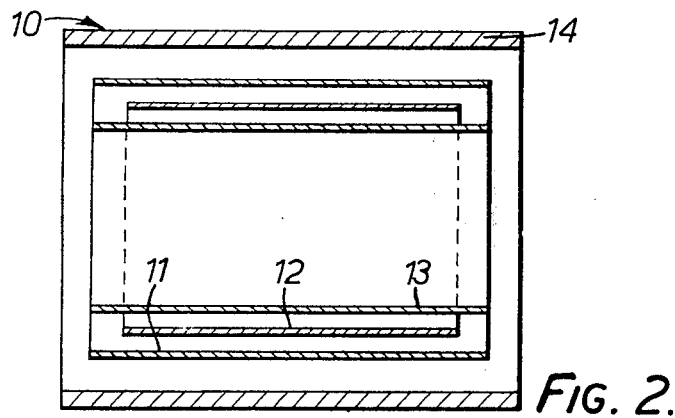
FIG. 2 is a partial longitudinal section of the transducer.

The capacitance transducer 10 (FIGS. 1 and 2) comprises three concentric conductive tubes 11, 12 and 13 surrounded by a protective outer tube 14. The tubes 11, 12 and 13 form plates or electrodes of a capacitor. The tubes 11 and 13 are electrically interconnected as by a weld stud (not shown) and form the low impedance plate of the capacitor. The tube 12 forms the high impedance plate of the capacitor and external electrical connection is made to this tube through a large opening (not shown) in the wall of the tube 11.

Teflon insulating posts (not shown) serve to space and maintain concentricity between the tubes 11, 12 and 13.

The outer tube 14 is maintained concentric with the tube 11 by means of perforated circular plates (not shown) at both ends of the transducer 10.

The outer tube 14 has suitable openings formed therein to allow the passage of electrical connection leads from the tube 12 and the tubes 11 and 13. Insulating bushings (not shown) are used where necessary to insulate and space connection leads from the tubes of the transducer.

Both ends of the transducer 10 are open allowing the liquid whose density is to be measured to stand in or flow through the tubes of the transducer and act as a dielectric between the two plates of the capacitor formed on the one hand by the tubes 11, 13 and on the other hand by the tube 12.

Typical dimensions of the transducer are a 3 inch diameter for the tube 11, a 5½ inch outside diameter and a ¼ inch wall thickness for the tube 14.

Figure 3:
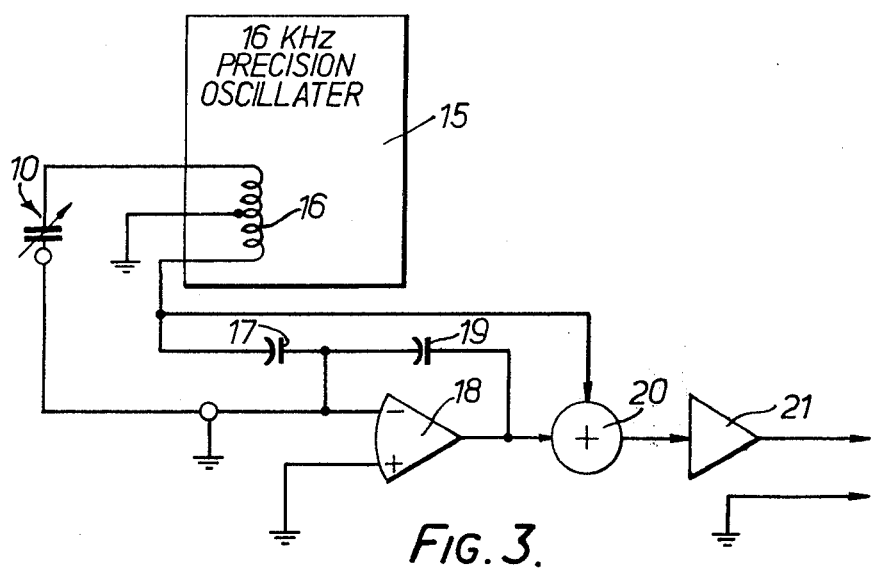
FIG. 3 is a block diagram of signal conditioning circuitry of the densitometer.

As shown in FIG. 3 the transducer 10 is connected to signal conditioning circuitry. The transducer is energized by an oscillator 15 (for example a 16 kHz precision oscillator).

One arm of a center-grounded output transformer 16 of the oscillator 15 is connected to one capacitor plate of the transducer 10 while the other plate of the transducer 10 is connected through a capacitor 17 to the other arm of the transformer 16. The value of the capacitor 17 is set such that a fixed capacitive reference current flows therethrough, and this current is predetermined to have a value corresponding to a selected minimum liquid density value. The function of the capacitor 17 and transducer 10 is connected to one input of a fixed-gain a.c. amplifier 18 whose other input is grounded and whose gain is set by the value of a capacitor 19 in a feed-back loop of the amplifier. The current input to the amplifier 18 is thus equal to the current through the transducer 10 less the reference current through capacitor 17.

The output of the amplifier 18 is connected to an adder circuit 20 which adds the signal on the output of the amplifier 18 to a fixed signal representing a minimum density value of the liquid (not necessarily the same minimum density as represented by the current through capacitor 17). The output of the adder circuit 20 is connected to an A.C. to D.C. converter 21 whose output signal is representative of the density of the liquid under measurement and can be fed to any suitable display.

The operation of the fluid densitometer will now be described.

The density characteristic of liquid within the transducer 10 is a function of its dielectric constant (K) and thus the value of capacitance between the plates of the transducer 10 varies as a function of the density of the liquid between the plates varies. This capacitance variation results in a variation of transducer current. The value of the reference current through the capacitor 17 is set at a chosen minimum value of K, i.e., Kmin, and this current is 180° out of phase with the transducer current. Current flow to the amplifier 18 is therefore equal to the difference between the actual transducer current and the current through the capacitor 17. This difference is proportional to the liquid density variation (ΔD) above a chosen minimum density value Dmin.

The amplified current signal at the output of the amplifier 18 is also proportional to the liquid density variation ΔD. and is added in the adder circuit 20 to a bias current signal from the oscillator 15 whose magnitude correspondingly represents a chosen minimum liquid density value (Dmin). These signals are in phase due to the 180 degrees phase shift produced by the amplifier 18.

The signal at the output of the adder circuit 20 thus represents the total liquid density (D). This signal is fed to the converter 21 where it is rectified before being fed to a display or control equipment.

The described densitometer is advantageous in that it enables the density of dielectric liquids to be measured in either a static or dynamic state and does not require a sample of liquid to be separated off into a separate container. There are no moving parts in the densitometer and a high degree of accuracy is possible, dependent on the machining tolerances of the tubes of the transducer.

The densitometer is also advantageous in that only a change of density signal from the transducer is amplified (and subsequently added to an accurately controlled bias signal to produce an absolute density signal) and thus, if the plates of the transducer become shorted together or a connection to a plate breaks the final output will only change by a limited amount.

The oscillator 15 is preferably of the type having current limiting capabilities (for example, limiting maximum current output to 10 milliamps) and is thus suitable for use where liquid fuels are under measurement.

The densitometer has a wide range of applications including use in liquid cargo tanks (e.g. containing liquefied natural gas) and aircraft fuel tanks.

What I claim:

1. A fluid densitometer comprising
   two spaced capacitor electrodes,
   means for passing fluid between the electrodes such that the capacitance between the electrodes is dependent upon the dielectric constant, and therefore the density of the fluid between the electrodes,
   a reference capacitor,
   a source of alternating currents having first and second outputs,
   first connecting means connecting the first output across the two said electrodes to drive an alternating current between the electrodes, whose magnitude is dependent upon the capacitance therebetween,
   second connecting means connecting the second output across the reference capacitor to drive an alternating current therethrough whose magnitude is equal to a predetermined low value of the current between the said electrodes,
   first circuit means connected to the first and second connecting means and arranged to subtract the current through the reference capacitor from the current between the electrodes to derive a current signal directly proportional to the variation of capacitance between the electrodes,
   means for producing a bias signal proportional to a predetermined low fluid density, and
   second circuit means connected to the first circuit means and the bias means to combined the said current signal with the bias signal to produce a combined signal directly proportional to the density of the fluid.

2. A fluid densitometer according to claim 1, in which the said two electrodes comprise three concentric open-ended conductive tubes of which the intermediate tube forms one said electrode, and means electrically connecting the innermost and the outermost tubes together to form the other said electrode.

3. A fluid densitometer according to claim 1, in which the first circuit means comprises means connected to the said outputs to provide a 180 electrical degree phase shift between the alternating currents respectively produced thereat, and a circuit arm common to the first and second connecting means whereby current in the circuit arm is the said current signal.

4. A fluid densitometer according to claim 3, comprising a current amplifier having an input, the input forming part of the said circuit arm.

5. A fluid densitometer according to claim 4, in which the said bias means comprises means connected to the said second output to produce the said signal in phase with the amplifier output.

6. A fluid densitometer comprising two spaced capacitor electrodes, means for passing fluid between the electrodes such that the variation of capacitance between the electrodes is dependent upon the variation of the fluid density, an oscillator connected between the two said electrodes to drive an alternating current between the two said electrodes whose magnitude is dependent upon the variation of the capacitance therebetween above a predetermined minimum capacitance value, first circuit means connected to the oscillator and the two said electrodes, and arranged to derive a first signal therefrom proportional to the part of the said alternating current which is dependent upon the variation of capacitance between the said electrodes, bias means for producing a second signal proportional to a predetermined low fluid density, and second circuit means connected to the first circuit means and the bias means to combine the first signal with the said second signal whereby the combined signal is directly proportional to the density of the fluid.

7. A fluid densitometer according to claim 7, comprising an amplifier connected between the first and second circuit means to amplify the said first signal before it is connected with the said second signal.

8. A fluid densitometer, comprising two capacitor electrodes, electrical insulating means maintaining a predetermined spacing between the electrodes, means for passing fluid between the electrodes such that the variation of capacitance between the electrodes is dependent on the variation of density of the fluid, a three-terminal alternating current source in which the alternating currents respectively produced between the first and second terminals and between the third and second terminals are 180° out of phase, a reference capacitor having a predetermined capacitance value, first connecting means connecting the two capacitor electrodes in series between the first and second terminals, second connecting means connecting the reference capacitor in series between the third and second terminals and having a common circuit path with the first connecting means, the predetermined capacitance value of the reference capacitor being selected such that the net current in the common circuit path is directly proportional to variations of capacitance between the two said electrodes and independent of the absolute capacitance therebetween, a current amplifier connected to amplify the current in the said common circuit path between the first and second connecting means to produce a first current signal, signal means for producing a second current signal proportional to a predetermined low fluid density, and an adder circuit connected to receive and add the first and second current signals to produce a combined output signal proportional to the density of the said fluid.

* * * * *